United States Patent [19]

Kawaguchi et al.

[11] Patent Number: 5,025,593
[45] Date of Patent: Jun. 25, 1991

[54] SLICING MACHINE AND CONTROL METHOD THEREOF

[75] Inventors: Keishi Kawaguchi, Higashihiroshima; Tatsumi Hamasaki, Hiroshima; Yoshihiro Tadera, Kure; Sachio Yamazaki, Hiroshima, all of Japan

[73] Assignee: Mazda Motor Corporation, Hiroshima, Japan

[21] Appl. No.: 297,473

[22] Filed: Jan. 13, 1989

[30] Foreign Application Priority Data

Jan. 18, 1988 [JP] Japan .................................... 63-7056
Apr. 26, 1988 [JP] Japan ................................ 63-103620

[51] Int. Cl.⁵ .......................................... B24B 49/16
[52] U.S. Cl. ................................. 51/165.77; 51/73 R; 51/165.8; 125/13.02; 83/72; 83/74
[58] Field of Search ...................... 125/13.01, 12, 13.02; 51/73 R, 165.77, 165.71, 165.8, 165.92, 5 D; 83/72, 74

[56] References Cited

U.S. PATENT DOCUMENTS 3,752,968  8/1973  Pilafidis et al. ................. 235/151.11
3,967,515  7/1976  Nachtigal et al. ................ 51/165.77
4,228,782 10/1980  Demers et al. .................... 125/13.02
4,420,909 12/1983  Steere, Jr. ...................... 125/13.02
4,604,834  8/1986  Thompson ........................ 51/165.77
4,653,361  3/1987  Zobeli ........................... 51/165.77

FOREIGN PATENT DOCUMENTS 1060466  7/1959  Fed. Rep. of Germany .
 248275  7/1966  Fed. Rep. of Germany .
1463038  6/1969  Fed. Rep. of Germany .
0016792  2/1979  Japan ............................ 51/73 R
62-70904  5/1987  Japan .

Primary Examiner—Robert A. Rose
Attorney, Agent, or Firm—Price, Heneveld, Cooper, DeWitt & Litton

[57] ABSTRACT

A slicing machine of this invention includes a blade having a cutting edge for slicing a silicon ingot, a tension disk for rotatably supporting the blade, a drive motor for rotating the blade, a deformation detection mechanism for detecting a deformation amount of the blade, and a control unit responsive to the measured deformation for correcting the relative position between the support base and the blade. A control method of the slicing machine is also disclosed.

7 Claims, 8 Drawing Sheets

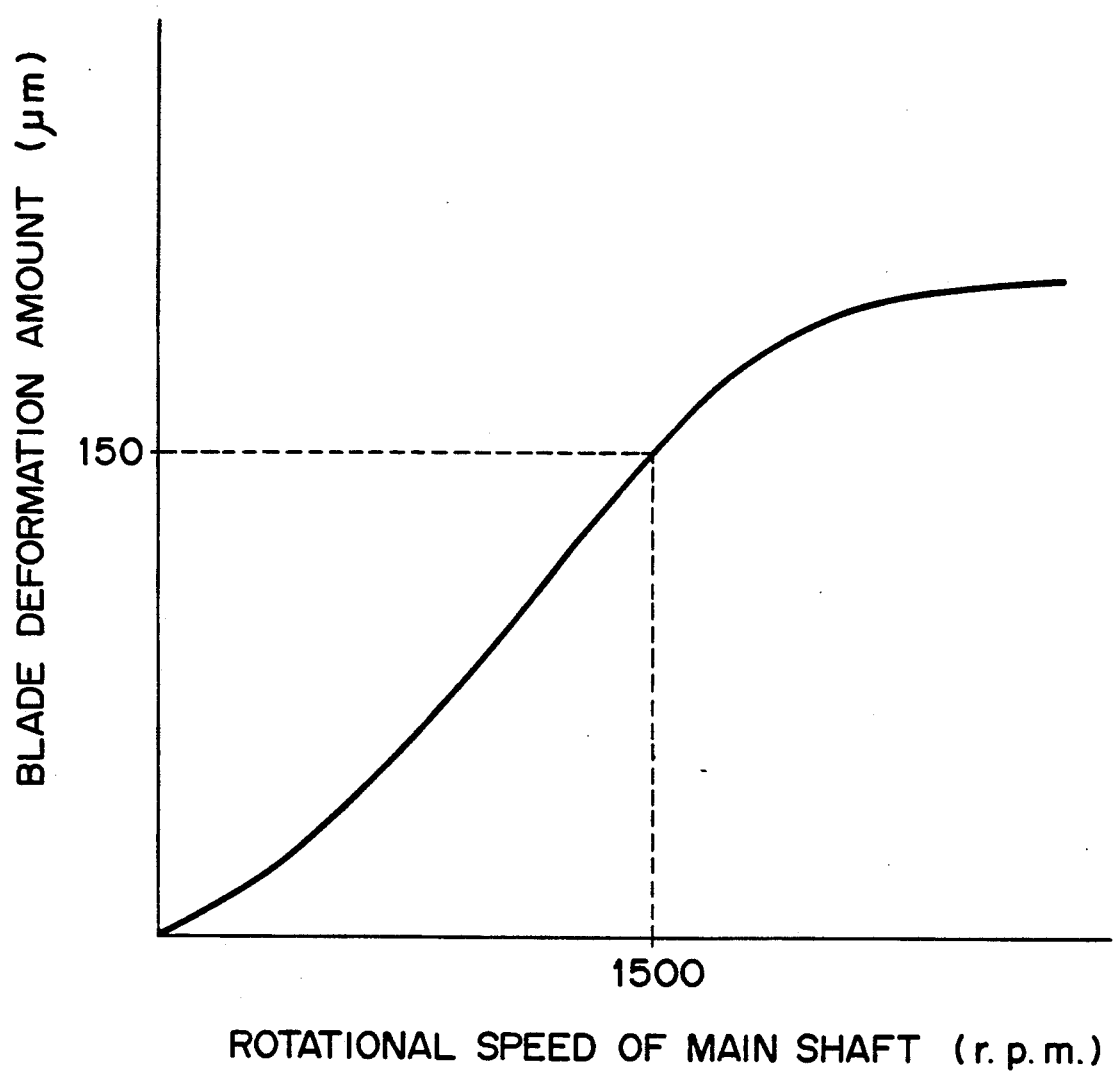
F I G. 3

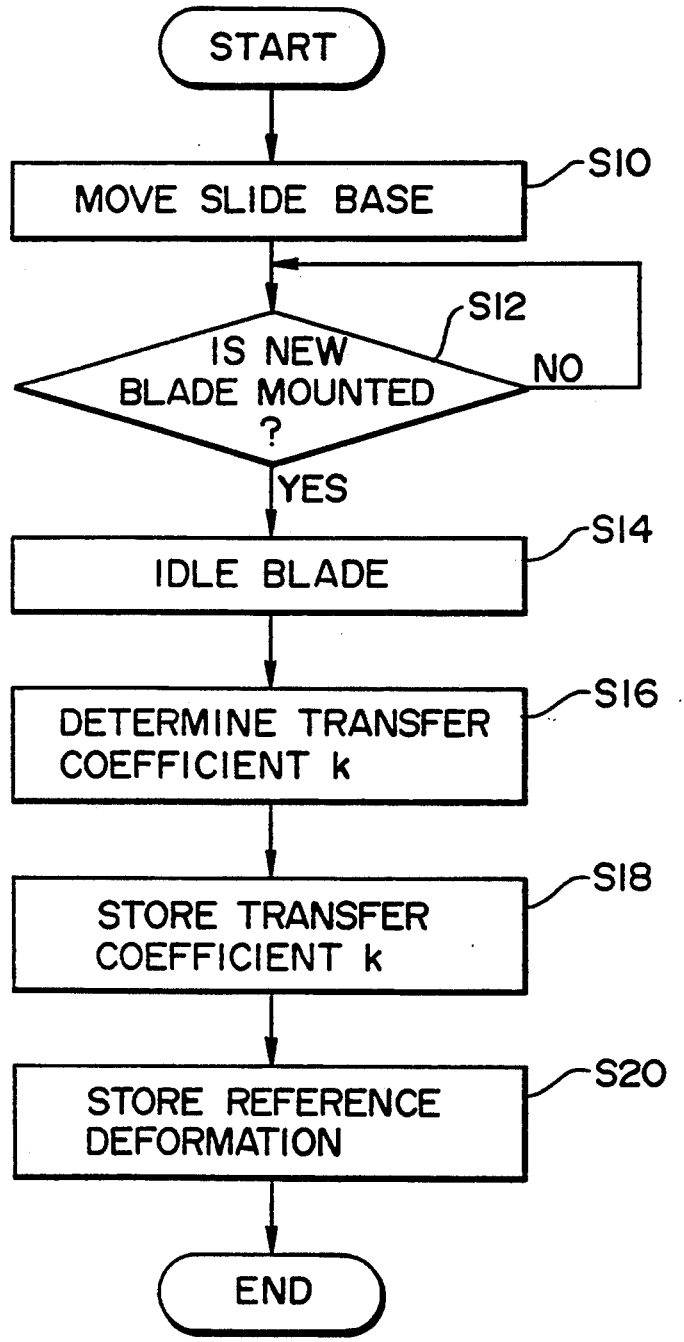
F I G. 4

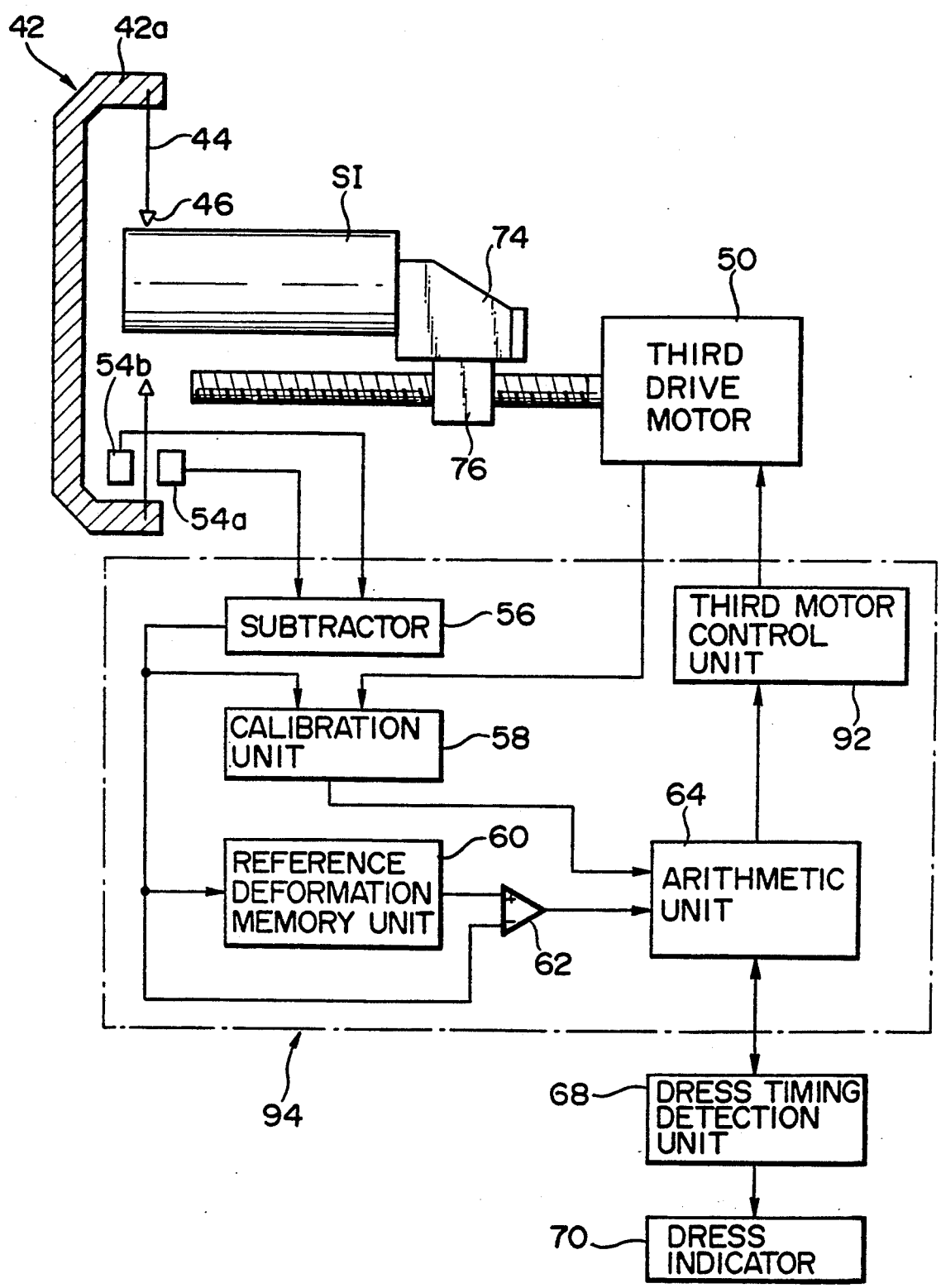
F I G. 7

SLICING MACHINE AND CONTROL METHOD THEREOF

BACKGROUND OF THE INVENTION

The present invention relates to a slicing machine used when thin silicon wafers are cut from a silicon ingot, and a control method thereof.

In a slicing machine, various cutting techniques are used. For example, in a conventional technique, a cutting tool having a circular inner peripheral cutting edge is mounted on a tool mounting base and is rotated, and the rotating cutting tool is fed relative to a work or the work is fed relative to the cutting tool, thereby cutting the work. In this cutting technique, thin silicon wafers can be efficiently cut from a silicon ingot.

However, in the cutting technique, the cutting edge is deformed, in other words, flexed in the direction of the rotational axis due to a cutting resistance caused by a change in cutting arc length between the cutting edge and the work, so that straightness of the cut surface of the cut work is impaired.

For this reason, in a conventional slicing machine, the flexure of the blade is measured during cutting of the work, and if the measured flexure is increased, the cutting speed is decreased to improve the straightness of cutting, as disclosed in Japanese Utility Model Laid-Open Publication (unexamined) No. 62-70904.

However, in the conventional arrangement, since the rotational speed of the blade is constant, even if the cutting speed is decreased, a force for correcting the flexure direction of the blade is insufficient, and surface precision of the work cut surface cannot be easily improved.

SUMMARY OF THE INVENTION

The present invention has been made in consideration of the above problems, and has as its object to provide a slicing machine capable of improving surface precision of a machining surface of an object to be machined with a simple arrangement, and a control method thereof.

It is another object of the present invention to provide a slicing machine which can provide an appropriate means for moving a work in accordance with a flexure during slicing of the work, so that the straightness of the cut surface of the work can be improved to target precision.

To attain the above-mentioned both objects, according to a first aspect of the present invention, there is provided a slicing machine which slices a work to a predetermined thickness, comprising: a rotary support means; a disk-shaped blade rotatably supported on the rotary support means and having a cutting edge for slicing the work at an inner peripheral portion thereof; a support base for supporting the work; work moving means for feeding the support base supporting the work by a predetermined amount with respect to the blade, the work fed by the work moving means being sliced by the cutting edge of the blade; flexure amount detection means, arranged near the blade, for detecting a flexure amount of the blade during a slicing operation; and correction means for correcting the flexure amount of the blade based on a detection amount of the flexure amount detection means so as to uniformly slice the work to the predetermined thickness, the correction means correcting the flexure amount by changing a relative position between the support base and the blade along a rotational axis direction of the blade.

In the slicing machine according to the present invention with the above arrangement, the flexure of the blade is corrected based on a detection amount obtained by detecting deformation of the blade upon cutting by the flexure amount detection means so as to cut a work into a uniform thickness. This correction is executed by changing a relative position between the support base and the blade along the rotational axis direction of the blade. In this manner, the deformation of the blade is essentially controlled so as not to occur, and surface precision of a machining surface of an object to be machined can be improved.

To attain the above-mentioned main object, according to a second aspect of the present invention, there is provided a slicing machine wherein the correction means includes: correction arithmetic means for calculating a correction rotational speed of the rotary support means for reducing a deformation amount detected by the flexure amount detection means to zero; and control means for correcting a rotational speed of the rotary support means with the correction rotational speed calculated by the correction arithmetic means.

In the slicing machine according to the present invention with the above arrangement, when the deformation of the blade upon cutting is detected by the detection means, a correction rotational speed of the rotary member is calculated by correction arithmetic means so that the deformation amount detected by the detection means is reduced to zero, and the rotational speed of the rotary member is corrected by the calculated correction rotational speed by the control means. In this manner, the deformation of the blade is essentially controlled so as not to occur, and surface precision of a machining surface of an object to be machined can be improved.

To attain the above-mentioned main object, according to a third aspect of the present invention, there is provided a control method of a slicing machine which slices a work to a predetermined thickness comprising: the first step of supporing a cutting tool having a cutting edge therearound on a rotatably supported rotary member so as to be deformed in a rotational axis direction according to a rotational speed; the second step of detecting a deformation amount upon cutting by the cutting tool; and the third step of controlling the rotational speed of the rotary member so that the detected deformation amount becomes zero.

To attain the above-mentioned the other object, according to a fourth aspect of the present invention, there is provided a slicing machine wherein the correction means comprises control means for causing the work moving means to variably control a feed amount of the work based on the detection amount from the flexure amount detection means.

In the slicing machine according to the present invention with the above arrangement, the work is fed by a predetermined amount by the work moving means with respect to the blade supported on the rotary support means, and is sliced to a predetermined thickness by a cutting edge provided to the inner peripheral edge portion of the blade. In this case, the flexure amount of the blade during slicing of the work is detected by the flexure amout detection means near the blade, and the feed amount of the work is variably controlled by the control means based on the detection value of the flexure detection means. The work is normally lighter than the rotary support means for supporting the blade, and is fixed to and supported on the work moving means.

Since the feed amount of the work which is lighter than the rotary support means and is fixed and supported is variably controlled, a response characteristic of feed movement of the work according to the flexure amount of the blade can be improved as compared to a case wherein the cutting speed of the rotary support means with respect to the work is variably controlled, so that the straightness of the cut surface of the work can be satisfactorily improved to target precision.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a graph showing the correlation between deformation of a blade and a rotational speed when the blade is idled;

FIGS. 4 to 6 show control sequences as a modification in the slicing machine of the embodiment, in which FIG. 4 is a flow chart showing a calibration control operation executed prior to a slicing operation, FIG. 5 is a flow chart showing a control sequence of the slicing operation, and FIG. 6 is a flow chart showing an interrupt routine in the slicing machine;

FIG. 7 is a block diagram showing an arrangement of a control system of another embodiment of a slicing machine according to the present invention.

DETAILED DESCRIPTION OF THE PREFERRED EMBODIMENTS

An embodiment of a slicing machine and a control method thereof according to the present invention will now be described in detail with reference to FIGS. 1 to 3.

Figure 1:
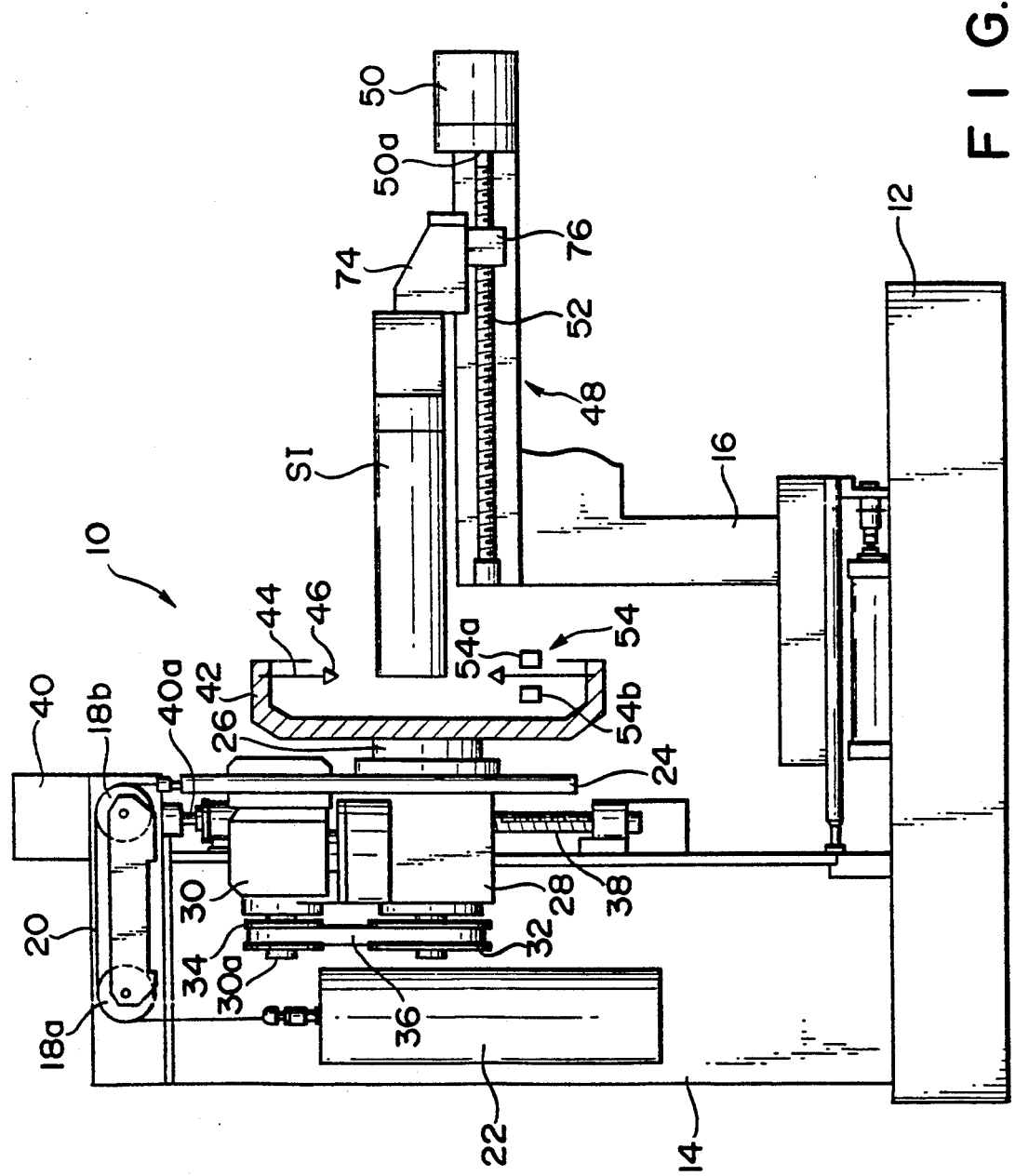
FIG. 1 is a front view schematically showing an arrangement of an embodiment of a slicing machine according to the present invention.

As shown in FIG. 1, a slicing machine 10 of this embodiment slices a silicon ingot SI as an object to be machined to form thin silicon wafers. The slicing machine 10 comprises a base 12 fixed on a foundation (not shown), a stand 14 standing upright on the base 12, and a slide base 16 juxtaposed with the stand 14 and slidably mounted on the base 12. The slide base 16 is arranged to slide in the right-and-left direction in FIG. 1, i.e., to reciprocate with respect to the stand 14.

A pair of pulleys 18a and 18b which are separated in the right-and-left direction in FIG. 1 are rotatably and axially supported on the upper portion of the stand 14. A wire 20 is looped between the pulleys 18a and 18b. A weight 22 is coupled to the left end of the wire 20 in FIG. 1, and a lift base 24 is coupled to its right end in FIG. 1, i.e., an end portion on the side of the slide base 16.

A horizontal main shaft 26 is axially supported on the lift base 24 through a bearing mechanism 28 to be rotatable about a horizontal axis. A first drive motor 30 for rotating the main shaft 26 is mounted on the upper portion of the bearing mechanism 28. A driven pulley 32 is coaxially fixed to an end portion of the main shaft 26. A drive pulley 34 is coaxially fixed to a drive shaft 30a of the first drive motor 30. An endless belt 36 is looped between the driven and drive pulleys 32 and 34. When the first drive motor 30 is started, the main shaft 26 is rotated.

A vertical ball screw 38 extends through the lift base 24 in a threadable engagement state. The upper end of the ball screw 38 is integrally coupled to a drive shaft 40a of a second drive motor 40 mounted on the upper surface of the stand 14. The above-mentioned weight 22 is set to be substantially equal to the total weight of the lift base 24, the main shaft 26, the bearing mechanism 28, and the first drive motor 30. In this manner, the second drive motor 40 can vertically move the main shaft 26 with a small load.

A tension disk 42 is coaxially and integrally mounted on the right end of the main shaft 26 in FIG. 1. The tension disk 42 has an entirely open end face on the side of the slide base 16. A vertical blade 44 of a disk-like thin plate is kept taut in the open portion. The blade 44 has a central opening, that is, has a so-called doughnut-like shape. A cutting edge (inner peripheral cutting edge) 46 is formed on the entire inner peripheral edge of the blade 44. The blade 44 and the cutting edge 46 constitute a blade for slicing the silicon ingot SI.

A slide table 48 supporting the silicon ingot SI is mounted on the slide base 16 to be slidable in the right-and-left direction in FIG. 1. A third drive motor 50 is mounted on the right end of the slide base 16 in FIG. 1. A drive shaft 50a of the third drive motor 50 extends in the right-and-left direction in FIG. 1. A ball screw 52 is coupled to the drive shaft 50a to be rotated together. The ball screw 52 is threadably engaged with the slide table 48. In this manner, upon rotation of the third drive motor 50, the slide table 48 is moved in the right-and-left direction, i.e., reciprocates with respect to the blade.

When the blade is attached to or detached from the tension disk 42, the slide base 16 is slid to be separated from the tension disk 42 so as not to interfere with the attachment/detachment operation. On the other hand, during the slicing operation of the silicon ingot SI, the slide table 48 is slid toward the tension disk 42 by a distance corresponding to a thickness to be sliced while the slide base 16 is fixed in position.

The doughnut-shaped blade 44 constituting the blade is formed of a very thin steel plate having a thickness of 1 mm or less. The inner peripheral cutting edge 46 is constituted by binding diamond particles with a binder.

Since the blade 44 is very thin, as described above, even if it is kept taut at a predetermined tension in the tension disk 42, the blade 44 may be deformed along the direction of the rotational axis. More specifically, when the cutting edge 46 is brought into contact with the silicon ingot SI upon downward movement of the main shaft 26 to slice it, the blade 44 is deformed in the right-and-left direction in FIG. 1 due to a change in cutting resistance generated between the cutting edge 46 and the silicon ingot SI.

In order to detect a deformation amount of the blade 44, a deformation detection mechanism 54 is provided to the blade 44 in a non-contact state. The deformation detection mechanism 54 comprises first and second deformation gauges 54a and 54b which are arranged to oppose two side surfaces of the blade 44. Each of the deformation gauges 54a and 54b comprises a so-called magnetic sensor, and detects a distance to the corresponding surface of the blade 44 in a non-contact state.

Note that the first and second deformation gauges 54a and 54b are connected to a subtractor 56. In the subtractor 56, the outputs from the deformation gauges 54a and 54b are subtracted from each other. In this manner, even if the outputs from the deformation gauges 54a and 54b include variation components (noise), since the variation components have the same period and amplitude, the variation components are subtracted by the subtraction of the subtractor 56, and are removed from the detection values.

Assuming that the first deformation gauge 54a outputs a first output signal $A_1$ and the second deformation gauge 54b outputs a second output signal $A_2$, the first output signal $A_1$ can be expressed by $A_1 = L_1 + N$, and the second output signal $A_2$ can be expressed by $A_2 = L_2 + N$. Note that reference symbols $L_1$ and $L_2$ denote original detection output components (i.e., values according to distances between the deformation gauges and the corresponding side surfaces of the blade); and N, the above-mentioned noise component.

When the subtractor 56 executes calculation of $A_1 - A_2$, it outputs the calculation result of $(L_1 + N) - (L_2 + N) = L_1 - L_2$. In this manner, the output from the subtractor 56 includes no noise component N.

The arrangement of a feedback control system for maintaining the flexure of the blade 44 to be "0" during slicing according to this embodiment will be described below with reference to FIG. 2.

Figure 2:
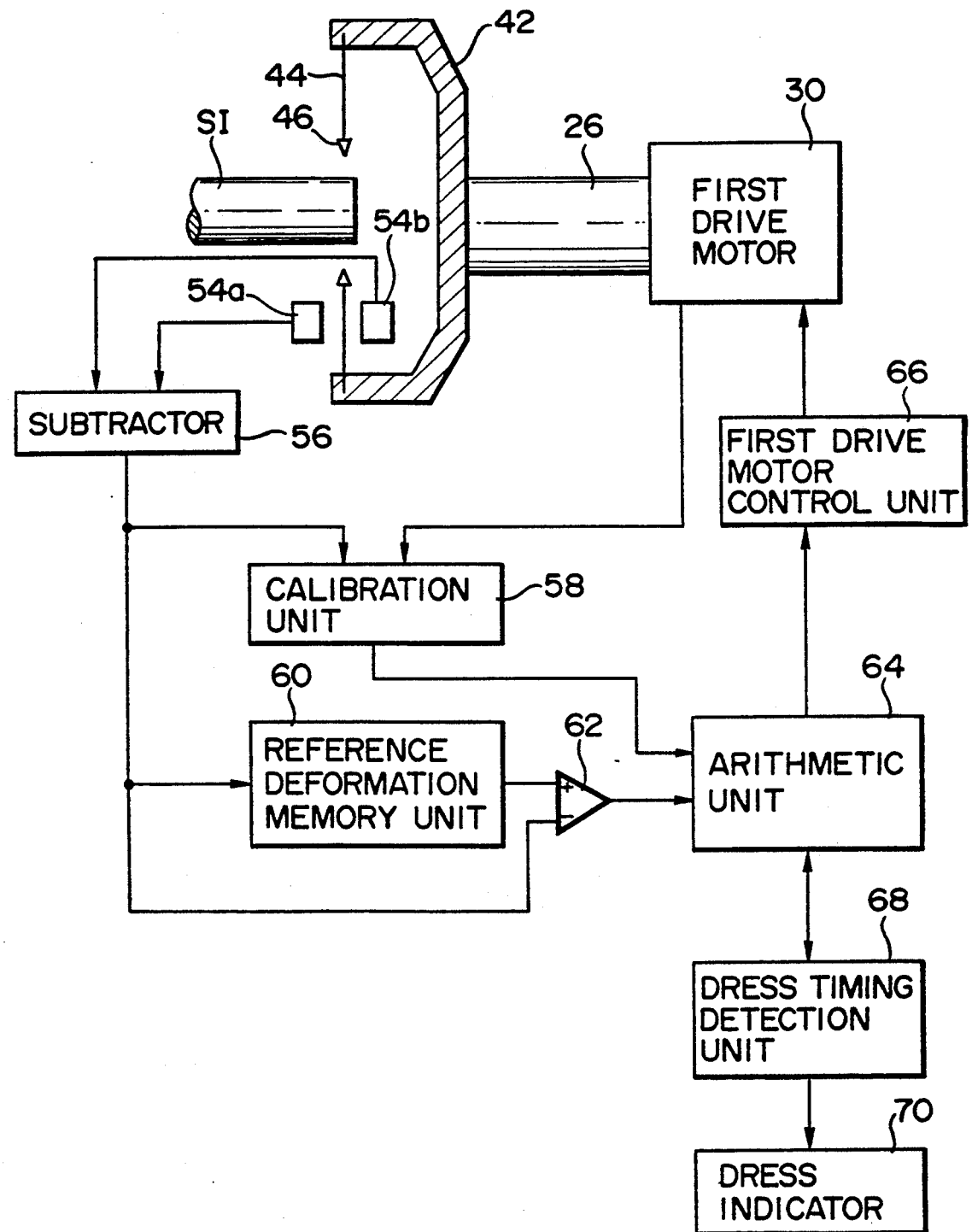
FIG. 2 is a block diagram showing an arrangement of a control system of the slicing machine shown in FIG. 1.

The output terminal of the subtractor 56 is connected to a calibration unit 58, a reference deformation memory unit 60, and the inverting input terminal of an operational amplifier 62, as shown in FIG. 2. The output terminal of the reference deformation memory unit 60 is connected to the non-inverting input terminal of the operational amplifier 62.

The calibration unit 58 is one form of a memory means, and receives a rotation signal from the first drive motor 30. The calibration unit 58 comprises a first detector 58a for detecting the rotational speed of the main shaft 26 based on the input rotation signal, and a second detector 58b for detecting a deformation amount of the blade 44 based on a deformation signal input from the subtractor 56. The calibration unit 58 also comprises an arithmetic memory circuit 58c for defining and storing a value indicating a correlation between the rotational speed and flexure of the blade 44, i.e., a transfer coefficient k in this feedback system based on the detection results from the first and second detectors 58a and 58b.

More specifically, the blade 44 is flexed (deformed) by the centrifugal force upon rotation. When the transfer coefficient k is given, an increment/decrement of the rotational speed necessary for returning the flexed blade 44 to a predetermined initial position can be calculated.

The calibration operation for obtaining the transfer coefficient k in the calibration unit 58 can be performed based on the relationship between the rotational speed of the blade 44 (i.e., the rotational speed of the main shaft 26) and a flexure amount (deformation amount), as shown in FIG. 3, when the blade is idled without slicing the silicon ingot SI.

The transfer coefficient k is different for each blade 44. In other words, the transfer coefficient k is an inherent value of each blade 44, and is also varied depending on the structure of the tension disk 42 and a tension force upon attachment to the tension disk 42. In this manner, the calibration operation is executed each time the blade 44 is replaced, so as to update and re-store the transfer coefficient k. As can be apparent from FIG. 3, the transfer coefficient k is not a constant, but is expressed by a predetermined function.

The output terminal of the calibration unit 58 is connected to an arithmetic unit 64 (to be described later), so that the transfer coefficient k is output to the arithmetic unit 64.

On the other hand, the reference deformation memory unit 60 stores a deformation amount (flexure) of the blade 44 produced when the main shaft 26 is rotated at the rotational speed employed when the silicon ingot SI is sliced, e.g., 1,200 r.p.m. in this embodiment, and always outputs it to the non-inverting input terminal of the operational amplifier 62. More specifically, in the actual slicing operation, after the first drive motor 30 is started and the rotational speed of the main shaft 26 has reached 1,200 r.p.m., the second drive motor 40 is started to move the blade downward. The reference deformation amount is defined from the deformation amount of the blade 44 before the second drive motor 40 is started when the rotational speed of the main shaft 26 has reached the predetermined value.

In other words, when the blade 44 is flexed during the slicing operation, the detected deformation amount is offset from the reference deformation amount. The blade 44 is deformed to correct the offset amount. Thus, the blade 44 can be maintained in an initial state, and the cut surface of the silicon ingot SI can be formed while maintaining good straightness.

In this embodiment, a means for deforming the blade 44 so as to correct the deformation amount of the blade 44 is realized by controlling the rotational speed of the main shaft 26.

As described above, the operational amplifier 62 receives the output signals from the reference deformation memory unit 60 and the subtractor 56, and calculates a deviation therebetween. In other words, the operational amplifier 62 outputs the deviation between the reference deformation amount and the present deformation amount.

The output terminal of the operational amplifier 62 is connected to the arithmetic unit 64. The arithmetic unit 64 calculates a change in rotational speed (correction rotational speed) necessary for reducing the deviation between the reference deformation amount and the present detected deformation amount based on the transfer coefficient k defined in advance by the calibration unit 58. More specifically, the arithmetic unit 64 calculates the correction rotational speed for correcting the rotational speed of the main shaft 26, necessary for deforming the blade 44 in a direction opposite to the deforming direction by the same deformation amount as that caused by the cutting resistance or the like of the blade 44.

The output terminal of the arithmetic unit 64 is connected to a control unit 66 for the first drive motor 30. The control unit 66 receives a signal indicating a deformation amount (correction rotational speed) necessary for reducing the deviation between the reference deformation amount and the present detected deformation amount, which is calculated by the arithmetic unit 64, and changes the rotational speed of the first drive motor 30 in accordance with the deformation amount.

The arithmetic unit 64 is connected to a dress timing detection unit 68 as a dress timing detection means for generating a blade dress signal when the calculated correction rotational speed exceeds a predetermined value. More specifically, when the cutting edge 46 becomes dull, the cutting resistance is increased, and the blade 44 tends to flex. When the flexure of the blade 44 exceeds a predetermined limit value (threshold value), the straightness precision of the sliced work exceeds a tolerance, resulting in a poor work shape. Therefore, when the flexure exceeds the threshold value, dressing must be executed to restore the sharpness of the cutting edge 46. The above-mentioned predetermined rotational speed is defined as a rotational speed corresponding to the threshold value of the flexure.

When the dress signal is output from the dress timing detection unit 68, a dress indicator 70 is, e.g., turned on, and signals the dress timing to an operator. Alternatively, in response to the dress signal, an automatic dress unit (not shown) can be started to automatically dress the cutting edge. The dress operation is executed by grinding a white stone (not shown) by a proper amount.

A method of controlling a deformation (flexure) along the rotational axis direction of the blade 44 in the slicing machine 10 with the above arrangement in a hardware manner will be explained below with reference to FIG. 2.

Each time a new blade 44 is attached to the tension disk 42, the calibration operation is executed upon replacement.

More specifically, the slide base 16 is separated away from the tension disk 42 by a large distance, and a new blade 44 is attached to the tension disk 42. At this time, only the first drive motor 30 is rotated, and the cutting tool is idled without slicing the silicon ingot SI by the cutting edge 46. The transfer coefficient k defined by the correlation between the rotational speed of the main shaft, i.e., the rotational speed of the blade 44 when the cutting tool is idled and the deformation amount according to the rotational speed of the blade 44 from the subtractor 56, i.e., the flexure amount is determined by the calibration unit 58, and is stored therein.

The deformation amount of the blade 44 at the rotational speed of the main shaft 26 used in the slicing operation is stored as a reference deformation amount in the reference deformation memory unit 60.

After the calibration operation and the storage of the reference deformation amount are executed, the slide base 16 is slid to a predetermined position adjacent to the tension disk 42 while the first drive motor 30 keeps rotating the main shaft 26 at a predetermined rotational speed. The third drive motor 50 is then started to slide the silicon ingot SI to a predetermined slice position. Thereafter, the second drive motor 40 is started to push the lift base 24 downward, and the upper portion of the cutting edge 46 of the rotating cutting tool is brought into contact with the silicon ingot SI from the above upon rotation of the main shaft 26, thus slicing the ingot.

Along with the progress of the slicing operation, the blade 44 is further flexed along the rotational axis direction upon a change in cutting resistance between the cutting edge 46 and the silicon ingot. However, in this embodiment, as will be described below, since feedback control is executed for the deformation of the blade 44, the deformation of the blade 44 is well maintained to be the reference deformation, and machining precision of the surface of the silicon ingot SI sliced by the cutting edge 46 attached to the blade 44, that is, the straightness, can be maintained well.

When the blade 44 is further deformed from the reference deformation, this change appears in the output values from the first and second deformation gauges 54a and 54b, and is directly reflected on the output result from the subtractor 56. The output signal from the subtractor 56 is input to the inverting input terminal of the operational amplifier 62, and as a result, the deviation between the present deviation from the subtractor 56 and the reference deformation is output from the output terminal of the operational amplifier 62.

The arithmetic unit 64 calculates a change in rotational speed (correction rotational speed) necessary for reducing the deviation to zero, i.e., returning the deformation amount of the blade 44 to the reference deformation amount based on the transfer coefficient k from the calibration unit 58. The arithmetic unit 64 outputs the calculated correction rotational speed to the control unit 66 for the first drive motor. The control unit 66 controls the rotation of the first drive motor 30 so that the rotational speed of the main shaft 26 is changed by a rotational speed according to the correction rotational speed.

More specifically, when the blade confining surface of the tension disk 42 is deformed in the rotational axis direction by the centrifugal force according to the rotational speed, the blade 44 is similarly deformed. For example, when the blade 44 is deformed in a direction to be separated from the main shaft 26, the output from the first deformation gauge 54a is decreased, and the output from the second deformation gauge 54b is increased. As a result, the output from the subtractor 56 is decreased. In other words, when the output from the subtractor 56 is decreased, this means that the blade 44 is deformed in the direction to be separated from the main shaft 26.

Therefore, the output from the operational amplifier 62 is changed on the positive side. When the output from the operational amplifier 62 is changed on the positive side, this means that the blade 44 is deformed in the direction to be separated from the main shaft 26. Therefore, the arithmetic unit 64 outputs a control signal to the control unit 66 so that the rotational speed of the main shaft 26 is increased by the correction rotational speed according to the deformation amount.

On the other hand, when the blade 44 is deformed to approach the main shaft 26, the output from the first deformation guage 54a is increased, and the output from the second deformation gauge 54b is decreased. As a result, the output from the subtractor 56 is increased. Therefore, the output from the operational amplifier 62 is changed on the negative side. When the output from the operational amplifier 62 is changed on the negative side, this means that the blade 44 is deformed to approach the main shaft 26. Thus, the arithmetic unit 64 outputs a control signal to the control unit 66 so that the rotational speed of the main shaft 26 is decreased by the correction rotational speed according to the deformation amount.

In this embodiment, the dress timing detection unit 68 is connected to the arithmetic unit 64. When the deformation amount of the blade 44 exceeds the threshold value preset in the detection unit 68 in either the positive or negative direction, it can be determined that the cutting edge 46 is dull, the cutting resistance is high, and the blade is deformed largely. Thus, the detection unit 68 outputs a dress signal to indicate a need for dressing of the cutting edge 46. In this embodiment, the dress timing of the cutting edge 46 can be automatically alarmed, and operation efficiency can be greatly improved.

The present invention is not limited to the above embodiment, and various changes and modifications may be made within the spirit and scope of the invention, as a matter of course.

Figure 5:
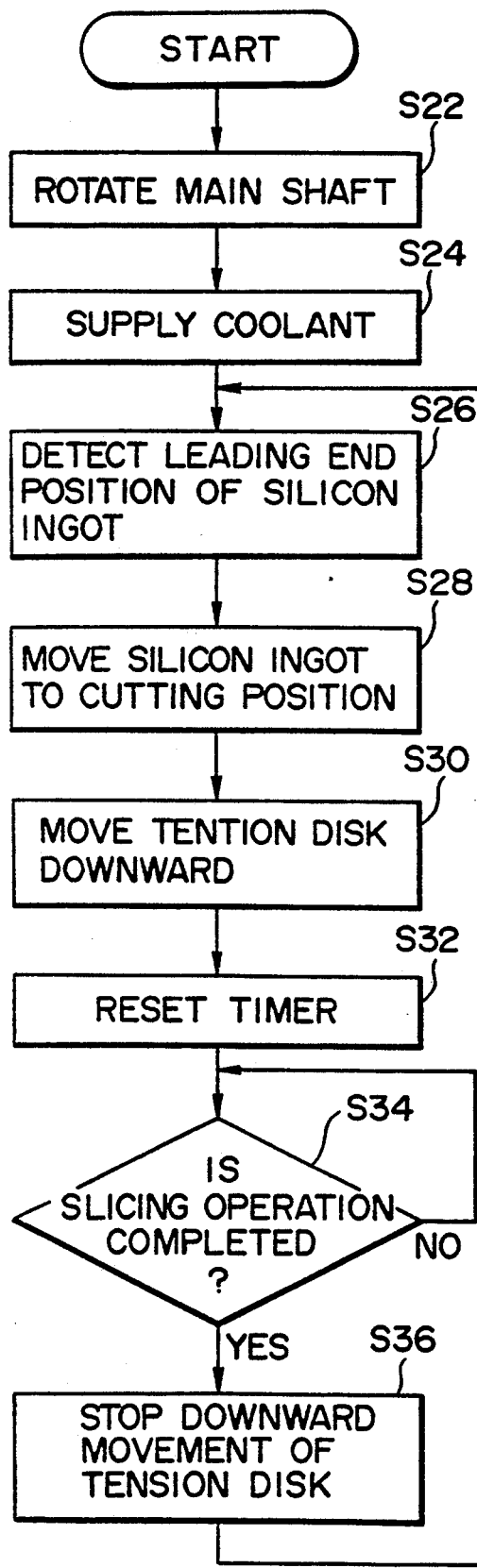
Figure 5:
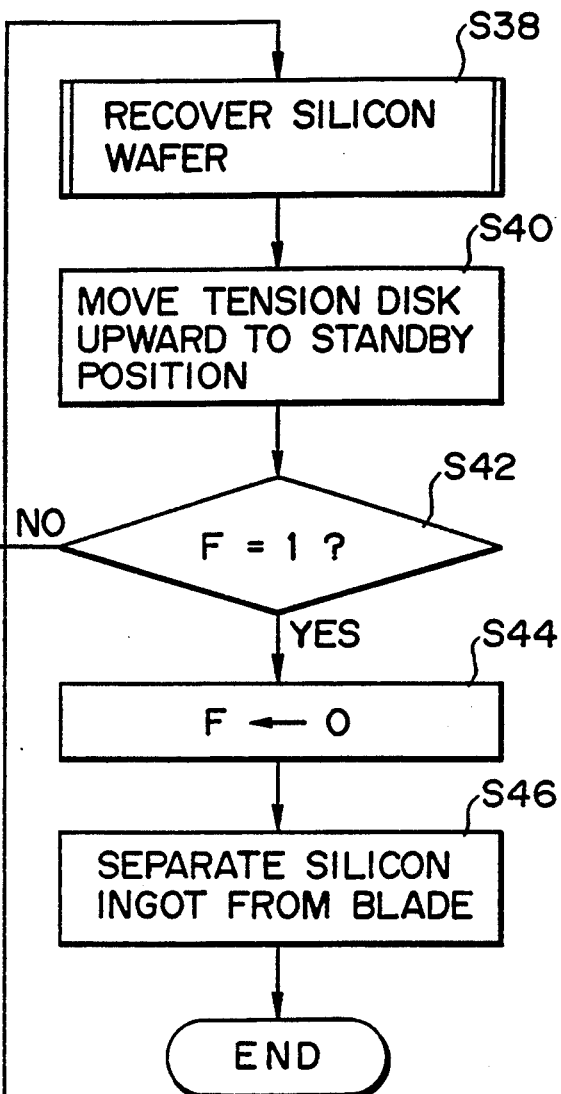
Figure 6:
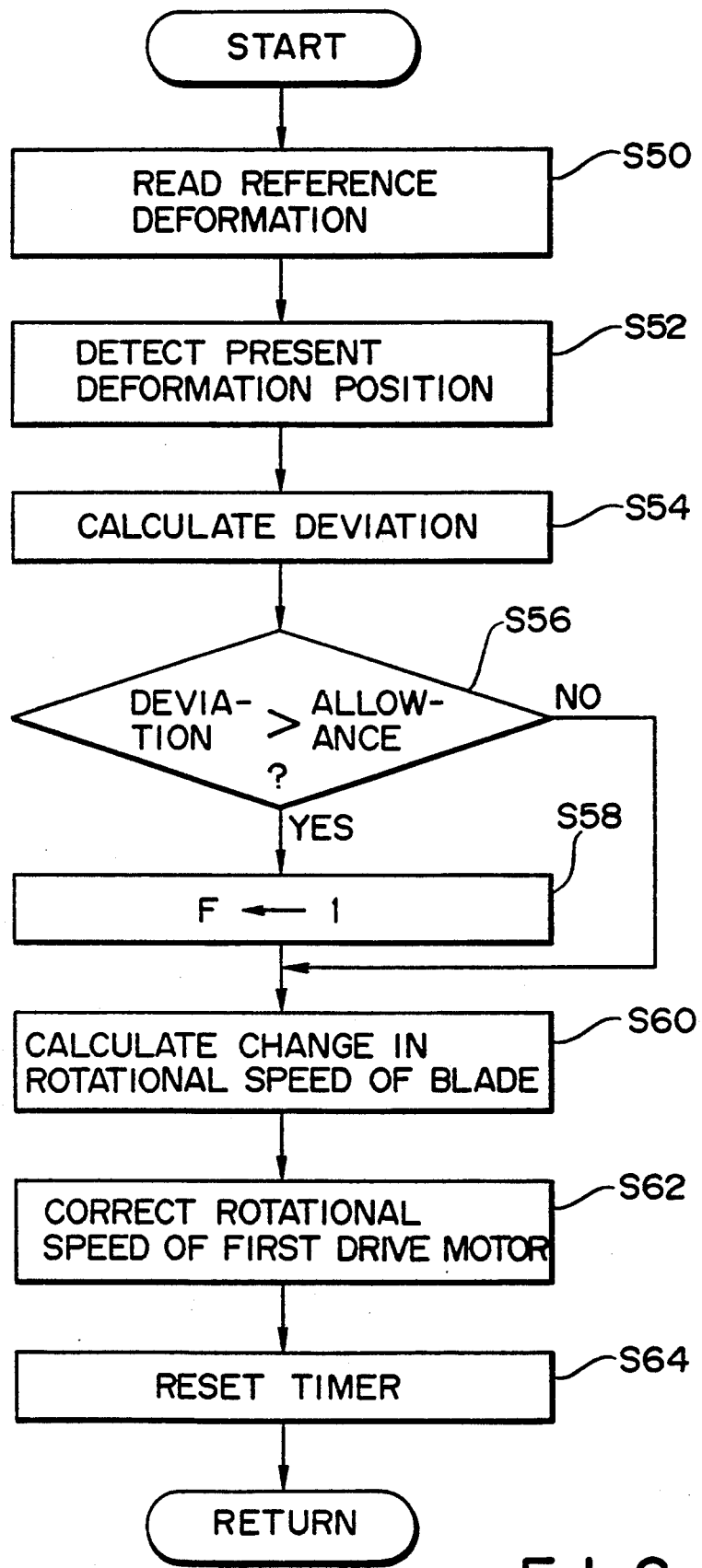

For example, in the above embodiment, the slicing operation is performed in a hardware manner based on the circuit arrangement shown in FIG. 2. However, this invention is not limited to this arrangement, and the slicing operation may be executed in a software manner by a control unit (not shown), as shown in FIGS. 4 to 6 as a modification.

A method of controlling a deformation (flexure) along the rotational axis direction of the blade 44 in the slicing machine 10 shown in FIG. 1 in a software manner will be explained below.

Each time a new blade 44 is attached to the tension disk 42, the calibration operation is performed upon replacement.

As shown in FIG. 4, in step S10, the slide base 16 is separated from the tension disk 42 by a large distance. It is checked in step S12 if a new blade 44 is attached to the tension disk 42. If YES in step S12, only the first drive motor 30 is rotated in step S14, so that the blade 44 is idled without slicing the silicon ingot SI by the cutting edge 46. The transfer coefficient k defined by the correlation between the rotational speed of the main shaft 26, i.e., the rotational speed of the blade 44 when the blade 44 is idled and the deformation amount according to the rotational speed of the blade 44 from the subtractor 56, i.e., the flexure amount is determined by the calibration unit 58 in step S16, and is stored in the arithmetic memory circuit 58c of the calibration unit 58 in step S18.

In step S20, the deformation amount of the blade at a predetermined rotational speed (initial rotational speed) of the main shaft 26 used in the slicing operation is stored as a reference deformation amount in the reference deformation memory unit 60.

In this manner, after the calibration operation and storage of the reference deformation amount are executed, a predetermined slicing control operation is executed.

When the slicing control operation is started, the first drive motor 30 is started in step S22, as shown in FIG. 5, so that the main shaft 26 is rotated at the initial rotational speed. In step S24, a coolant is supplied to a portion to be sliced of the silicon ingot SI. In step S26, the third drive motor 50 is started to detect the leading end position of the silicon ingot SI. After detection, in step S28, the third drive motor 50 is further driven, and the leading end portion of the silicon ingot SI is moved to reach a predetermined slicing position. Thereafter, in step S30, the second drive motor 40 is started to push the lift base 24 downward, and the upper portion of the cutting edge 46 of the rotating blade 44 is brought into contact with the silicon ingot SI from the above upon rotation of the main shaft 26, thus slicing the ingot.

When the second drive motor 40 is driven and the slicing operation is started, a timer (down counter; not shown) is started in step S32 to initiate down-counting of a predetermined time. This timer is arranged to define a start timing of an interrupt routine (to be described later) during the slicing operation. Every time the value of the timer reaches zero, the interrupt routine is executed.

After step S32 is executed, the cutting edge 46 is brought into contact with the silicon ingot SI and the slicing operation is actually started. Thus, the blade 44 is further flexed in the rotational axis direction upon a change in cutting resistance or the like between the cutting edge 46 and the silicon ingot SI. However, in this embodiment, as will be described below in the interrupt routine, feedback control is executed for the deformation of the blade 44. Therefore, the deformation of the blade 44 can be well maintained to be the reference deformation, and machining precision of the sliced surface of the silicon ingot SI sliced by the cutting edge 46 attached to the blade 44, that is, the straightness can be maintained well.

Thereafter, in step S34, completion of the slicing operation is detected. If the completion of the slicing operation is detected in step S34, driving of the second drive motor 40 is stopped, and downward movement of the tension disk 42 is stopped in step S36. In step S38, a sliced silicon chip, i.e., a silicon wafer is recovered. Thereafter, in step S40, the second drive motor 40 is driven in the reverse direction, and the tension disk 42 is moved upward to a standby position.

In step S42, necessity of the dress operation is discriminated. If it is determined that the dress operation is necessary, a flag F is set in the interrupt routine (to be described later). It is checked in step S42 if the flag F is set. If NO in step S42, i.e., if the flag F is not set and the dress timing is not reached, the flow returns to step S26, and the slicing operation is continued, thus cutting the next silicon wafer.

If YES is obtained in step S42, i.e., if the flag F is set and the dress timing is reached, the flag F is reset in step S44. In step S46, the third drive motor 50 is driven to separate the silicon ingot SI from the blade 44. In this manner, execution of the dress operation as described in the above embodiment is prepared, and this control operation is ended.

The interrupt routine during the slicing operation will be described below with reference to FIG. 6.

When the timer (not shown) counts down for a predetermined period of time and reaches zero, the interrupt routine is started. When the interrupt routine is started, the reference deformation defined by the calibration control operation is read in step S50, and the present deformation amount (i.e., flexure amount) of the blade 44 is detected based on the output from the subtractor 56, in step S52. In step S54, a deviation between the values obtained in steps S50 and S52 is calculated.

Thereafter, it is checked in step S56 if the deviation calculated in step S54 is larger than a predetermined allowance. If YES in step S56, i.e., if the calculated deviation is larger than the predetermined allowance, i.e., if the blade is flexed largely, the dress operation is necessary before the next slicing operation, i.e., the dress timing is reached Thus, the flag F indicating the dress operation is set in step S58. In step S60, a change in rotational speed of the blade 44 (rotational speed of the main shaft 26) for reducing the deviation to zero is calculated based on the correlation shown in FIG. 3.

If NO in step S56, i.e., if it is determined that the calculated deviation is smaller than the predetermined allowance and the dress operation need not be executed prior to the next slicing operation, the flow directly advances to step S60.

After step S60 is executed, the rotational speed of the first drive motor 30 is corrected so as to obtain the rotational speed of the blade 44 defined in step S60. Thereafter, in step S64, the timer is reset, and the control returns to the slice control sequence as the main routine.

As described above, according to this modification, the control operation is not executed in the hardware manner unlike in the above embodiment, but can be executed by a control unit in a software manner.

In the above embodiment, in order to maintain the flexure of the blade 44 to be the initial deformation amount, the rotational speed of the first drive motor 30 for rotating the blade 44 is controlled so that the flexure upon downward movement of the blade 44 for slicing becomes zero. However, the present invention is not limited to the above arrangement, and may employ an arrangement shown in FIGS. 7 and 8 as another embodiment.

Another embodiment of the present invention will be described below. In the following description, the same reference numerals denote the same parts as in the previous embodiment, and a detailed description will be omitted.

A slicing machine 100 according to another embodiment comprises a base denoted by reference numeral 12, the stand 14, slide base 16, pulleys 18a and 18b, wire 20, weight 22, lift base 24, main shaft 26, bearing mechanism 28, first drive motor 30, driven pulley 32, drive pulley 34, endless belt 36, ball screw 38, second drive motor 40, tension disk 42, blade 44, and ball screw 52. The slide base 16 slides along the base 12 so as to move forward/backward with respect to the stand 14 upon expansion/contraction of a forward/backward cylinder 17.

The main shaft 26 is mounted on the lift base 24. The circular dish-like tension disk 42 is mounted on the distal end (right end in FIG. 8) of the main shaft 26 so that its opening portion faces the slide base 16. The tension disk 42 is rotated integrally with the main shaft 26. The 0.15-mm thick blade 44 formed of a disk-shaped thin plate having a central opening and flexibility is kept taut and supported on a blade support portion 42a at the outer peripheral portion of the tension disk 42 through a ring-shaped mounting jig 70 so as to cover the opening of the tension disk 42. On the other hand, the 0.38-mm thick cutting edge 46, comprising a diamond abrasive, for slicing the silicon ingot SI to a predetermined thickness (e.g., 0.8 mm) is integrally mounted on the inner peripheral portion of the blade 44.

The first drive motor 30 for driving the main shaft is mounted on the main shaft 26. When the rotational torque of the first drive motor 30 is transmitted to the main shaft 26 through the endless belt 36 looped between the pulleys 32 and 34, the main shaft 26 is rotated.

The second drive motor 40 for vertically moving the main shaft is placed on the upper end of the stand 14. The drive shaft 40a extending downward from the second drive motor 40 is coupled to the vertical ball screw 38 supported on the stand 14 through bearing mechanisms 41a and 41b. The lift base 24 is threadably engaged with the ball screw 38 through a ball screw mechanism (not shown) arranged on its rear surface (left side in FIG. 8). The lift base (i.e., the main shaft 26) is moved upward/downward upon normal/reverse rotation of the second drive motor 40. The weight 22 is set to balance with the total weight of the lift base 24, main shaft 26, first drive motor 30, tension disk 42, and the like, thus allowing smooth vertical movement of the lift base 24.

The slide table 48 for supporting the silicon ingot SI to which a carbon base (not shown) as a receiving base is integrally adhered while the carbon base faces down is arranged on the slide base 16. The third drive motor 50 for feeding a work is arranged on the trailing end (right end in FIG. 8) of the slide table 48. A second ball screw 52 is coupled to the drive shaft 50a of the third drive motor 50. The second ball screw 52 is supported on the slide table 48 through a bearing 72 and horizontally extends toward the tension disk 42. The second ball screw 52 is also threadably engaged with a push member 74 for pushing the silicon ingot SI toward the tension disk 42 through a ball screw mechanism 76 arranged on the lower surface of the push member 74. In this manner, the silicon ingot SI is reciprocally moved upon normal/reverse rotation of the third drive motor 50.

When the third drive motor 50 is rotated in, e.g., the normal direction, the silicon ingot SI is moved forward by a predetermined feed amount. Thereafter, the tension disk 42 which is rotated upon driving of the first drive motor 30 is moved downward upon, e.g., normal rotation of the second drive motor 40. Thus, the silicon ingot SI is sliced to a predetermined thickness by the cutting edge 46 of the blade 44, which is mounted on the tension disk 42 to be rotated together. After the silicon ingot SI is sliced, the silicon ingot SI is moved backward by a predetermined amount upon reverse rotation of the third drive motor 50 so as to take out the cut silicon wafer outside the apparatus.

Therefore, the slide table 48, third drive motor 50, second ball screw 52, push member 74, and the like constitute a work moving mechanism 78 for supporting the silicon ingot SI and feeding the silicon ingot SI by a predetermined feed amount with respect to the blade 44 so as to slice it to a predetermined thickness.

Figure 8:
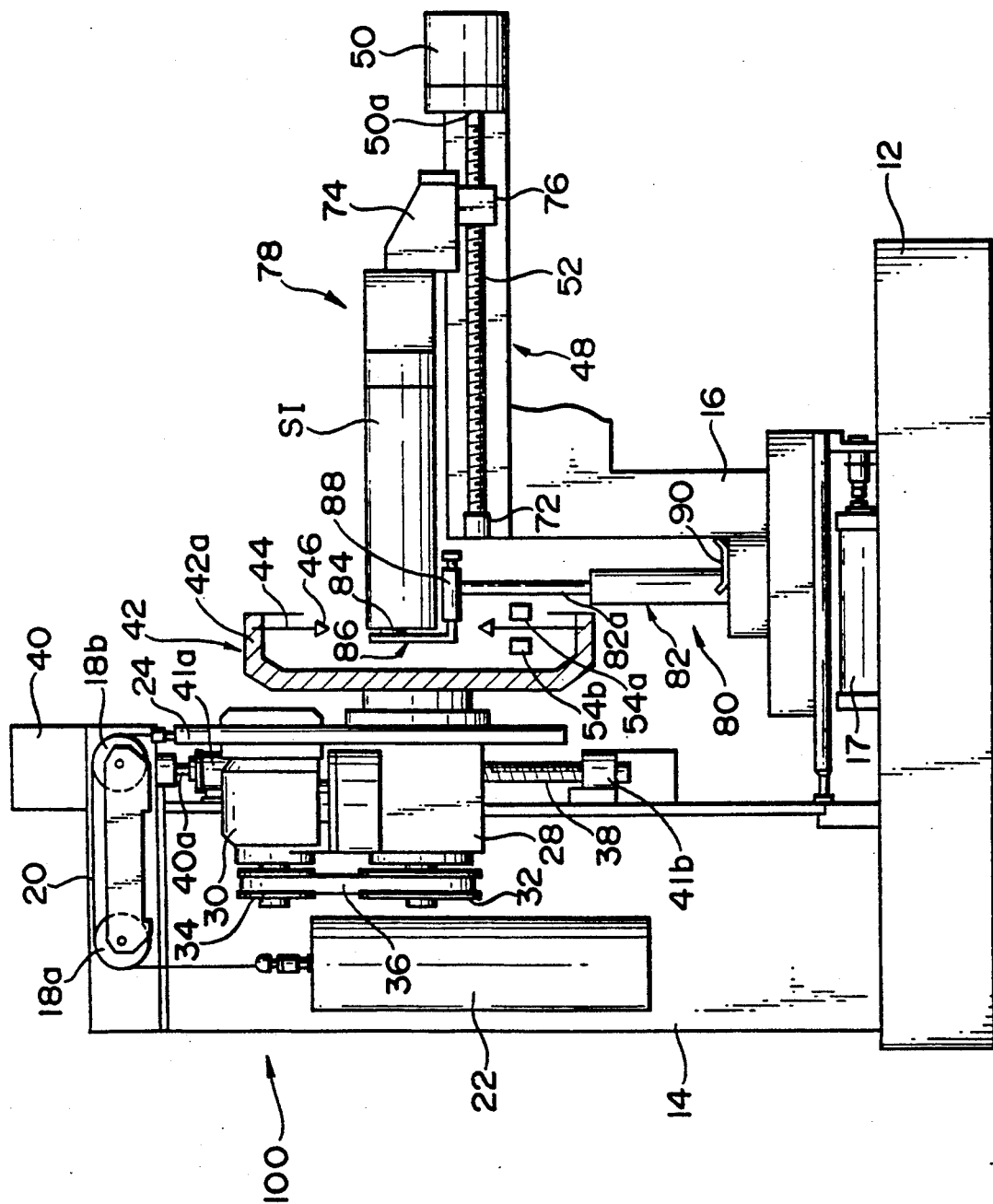
FIG. 8 is a front view schematically showing an arrangement of the slicing machine shown in FIG. 7.

A suction unit 80 for chucking a cut silicon wafer having a predetermined thickness from the silicon ingot SI by the cutting edge 46 of the slicing machine 100 is arranged on the slide base 16 near the front surface of the slide table 48 (left side in FIG. 8). The suction unit 80 comprises a lift cylinder 82, having a piston rod 82a extending upward, for taking out a silicon wafer. An L-shaped take-out arm 86 having a plurality of suction pads 84 (only one is illustrated in FIG. 8) on its distal-end flat portion is rotatably inserted and supported in a cylindrical support member 88 at the distal end of the piston rod 82a of the cylinder 82.

In order to take out a silicon wafer cut from the silicon ingot SI, the silicon wafer is chucked by the suction pads 84, and the slide base 16 is moved backward. Thereafter, the silicon ingot SI is moved backward upon, e.g., reverse rotation of the third drive motor 50. The take-out arm 86 is rotated through 180 degrees in the vertical direction about the cylindrical support portion 88, and the cylinder 82 is contracted to transfer the silicon wafer onto a tray 90 therebelow.

The pair of first and second deformation gauges 54a and 54b as a flexure amount detection means (deformation detection mechanism 54) for detecting a flexure amount during slicing of the silicon ingot by the blade 44 are arranged near two sides of the blade 44. These deformation gauges 54a and 54b detect distances between the blade 44 and the deformation gauges 54a and 54b, i.e., the flexure amount of the blade 44.

The first and second deformation gauges 54a and 54b are connected to the subtractor 56, as shown in FIG. 7, so that the outputs from the first and second deformation gauges 54a and 54b are subtracted from each other. Therefore, even if the outputs from the first and second deformation gauges 54a and 54b include periodical variation components (noise), the variation components are removed from the detection value by subtraction.

The output terminal of the subtractor 56 is connected to the calibration unit 58, the reference deformation memory unit 60, and the inverting input terminal of the operational amplifier 62. The output terminal of the reference deformation memory unit 60 is connected to the non-inverting input terminal of the operational amplifier 62. The calibration unit 58 is one mode of a storage means, and receives a rotation signal from the third drive motor 50. The calibration unit 58 comprises a first detector (not shown) for detecting a feed amount of the silicon ingot SI based on the input rotation signal, and a second detector (not shown) for detecting a deformation amount (flexure amount) of the blade 44 based on a deformation signal input from the subtractor 56.

The calibration unit 58 defines and stores a value indicating a correlation between the feed amount of the silicon ingot SI and the flexure of the blade 44, i.e., a transfer coefficient k in this feedback system based on the detection results from the first and second detectors. The blade 44 is flexed (deformed) by the centrifugal force upon rotation. When the transfer coefficient k is presented, an increment/decrement of the feed amount of the silicon ingot SI according to the flexure amount of the blade 44 can be calculated. The output terminal of the calibration unit 58 is connected to the arithmetic unit 64 (to be described later), so that the transfer coefficient k is output to the arithmetic unit 64.

The reference deformation memory unit 60 stores a deformation amount (flexure amount) of the blade 44 produced when the main shaft is rotated at a rotational speed, e.g., 1,200 r.p.m. employed in the slicing operation by the cutting edge 46, and always outputs it to the non-inverting input terminal of the operational amplifier 62. More specifically, after the first drive motor 30 is driven and the rotational speed of the main shaft 26 reaches 1,200 r.p.m. in the actual slicing operation, the second drive motor 40 is driven to move the blade 44 downward. The reference deformation amount is defined based on a deformation amount of the blade 44 before the second drive motor 40 is started when the rotational speed of the main shaft 26 reaches a predetermined value. In other words, when the blade 44 is flexed upon a slicing operation, the operational amplifier 62 outputs a deviation between the reference deformation amount and the present detected deformation amount.

The output terminal of the operational amplifier 62 is connected to the arithmetic unit 64. The arithmetic unit 64 calculates a change in rotational speed (correction rotational speed) necessary for reducing the deviation between the reference deformation amount and the present detected deformation amount based on the transfer coefficient k which is defined in advance by the calibration unit 58. The output terminal of the arithmetic unit 64 is connected to a third drive motor control unit 92 for driving the third drive motor 50. The third drive motor control unit 92 receives a signal indicating the change in rotational speed (correction rotational speed) necessary for reducing the deviation between the reference deformation amount and the present detected deformation amount, which is calculated by the arithmetic unit 64, and controls rotation of the third drive motor 50 so as to change its rotational speed according to the change signal.

The arithmetic unit 64 is connected to the dress timing detection unit 68 for generating a dress signal of the cutting edge 46 when the correction rotational speed calculated thereby exceeds a predetermined value. More specifically, when the cutting edge 46 becomes dull, the cutting resistance of the cutting edge 46 is increased, and the blade 44 tends to flex. Therefore, when the flexure of the blade 44 exceeds a predetermined limit value (threshold value), dressing for recovering the sharpness of the cutting edge 46 is performed. The predetermined rotational speed is defined as a rotational speed corresponding to the threshold value of the flexure of the blade 44. When the dress signal is output from the dress timing detection unit 68, the dress indicator 70 is, e.g., turned on and signals the dress timing of the cutting edge 46 to an operator. Alternatively, in response to the dress signal, an automatic dress unit (not shown) can be started to automatically perform the dress operation.

The subtractor 56, calibration unit 58, reference deformation memory unit 60, operational amplifier 62, arithmetic unit 64, third drive motor control unit 92, and the like constitute a control mechanism 94 for variably controlling a feed amount of the silicon ingot SI based on detection values from the first and second deformation gauges 54a and 54b.

As described above, in this embodiment, the flexure amount of the blade 44 which is flexed by the cutting resistance during slicing of the silicon ingot SI is detected by the pair of first and second deformation gauges 54a and 54b arranged near the two sides of the blade 44, and the detection values are subtracted by the subtractor 56. The calculation result is output to the calibration unit 58, the reference deformation memory unit 60, and the operational amplifier 62. The calibration unit 58 determines the transfer coefficient k based on the correlation with the rotational speed of the third drive motor 50, and inputs it to the arithmetic unit 64.

On the other hand, a deviation between the reference deformation amount stored in the reference deformation memory unit 60 and the present deformation amount output from the subtractor 56 is output from the output terminal of the operational amplifier 62 to the arithmetic unit 64. The arithmetic unit 64 calculates a change in rotational speed (correction rotational speed) of the third drive motor 50 necessary for reducing the deviation to zero based on the transfer coefficient k from the calibration unit 58, and outputs the calculated correction rotational speed to the third drive motor control unit 92. In this manner, the rotation of the third drive motor 50 is controlled. As a result, the feed amount of the silicon ingot SI with respect to the cutting edge 46 can be variably controlled according to the flexure amount of the blade 44.

In this manner, the feed amount of the silicon ingot SI which is lighter than the tension disk 42 for supporting the blade 44 to be rotated together and is fixed and supported on the slide table 48 of the slide base 16 with respect to the blade 44 is variably controlled, so that a response characteristic of the feed speed of the silicon ingot SI can be improved according to the flexure amount of the blade 44 as compared to a case wherein the cutting speed of the tension disk 42 to the silicon ingot SI is variably controlled. Thus, the straightness of the sliced surface of the silicon ingot SI can be improved to target precision.

In this embodiment, the feed amount of the silicon ingot SI is variably controlled according to the flexure amount of the blade 44. Instead, control may be made wherein when the blade 44 is flexed by a predetermined amount, the feed amount of the silicon ingot SI is changed by the predetermined amount.

As described above, according to this embodiment, the flexure amount of a blade supported on a rotary support member during slicing of a work is detected by a flexure amount detection means, and the feed amount of a work fed by a work moving means is variably controlled based on the detection value from the flexure amount detection means. Thus, the response characteristic of the feed speed of the work according to the flexure amount of the blade can be improved, and straightness of the sliced surface of the work can be satisfactorily improved to target precision.

As many apparently widely different embodiments of the present invention can be made without departing from the spirit and scope thereof, it is to be understood that the invention is not limited to the specific embodiments thereof except as defined in the appended claims.

What is claimed is:

1. A slicing machine which slices a work to a predetermined thickness, comprising:
   a rotary support means attached to a fixed position;
   a disk-shaped blade rotatably supported on said rotary support means and having a cutting edge for slicing said work at an inner peripheral portion thereof;
   a support base for supporting said work, said support base being movable in the rotational axis direction of said blade;
   work moving means for moving said support base supporting said work in said rotational axis direction, said work fed by a predetermined amount with respect to said blade by said work moving means being sliced by said cutting edge of said blade;
   flexure amount detection means, arranged near said blade, for detecting a flexure amount of said blade during a slicing operation; and
   correction means for correcting the flexure amount of said blade based on a detection amount of said flexure amount detection means so as to uniformly slice said work to the predetermined thickness, said correction means correcting the flexure amount by changing the relative position between said support base and said blade in said rotational axis direction of said blade during the slicing operation.

2. The slicing machine according to claim 1, wherein said correction means includes:
   correction arithmetic means for calculating a correction rotational speed of said rotary support means for reducing a deformation amount detected by said flexure amount detection means to zero; and
   control means for correcting a rotational speed of said rotary support means with the correction rotational speed calculated by said correction arithmetic means.

3. The slicing machine according to claim 2, which further comprises:
   storage means for storing a correlation between the rotational speed of said rotary support means and the deformation amount of the blade according to the rotational speed in correspondence with the blade supported on said rotary support means.

4. A slicing machine which slices a work to a predetermined thickness, comprising:
   a rotary support means attached to a fixed position;
   a disk-shaped blade rotatably supported on said rotary support means and having a cutting edge for slicing said work at an inner peripheral portion thereof;
   a support base for supporting said work;
   work moving means for feeding said support base supporting said work by a predetermined amount with respect to said blade, said work fed by said work moving means being sliced by said cutting edge of said blade;
   flexure amount detection means, arranged near said blade, for detecting a flexure amount of said blade during a slicing operation, said flexure amount detection means including:
   a pair of deformation guages arranged to oppose each other on two sides of said blade and comprising magnetic sensors;
   a subtractor, connected to said deformation guages, for subtracting signals input from said deformation gauges and outputting a difference;
   reference deformation amount storage means for storing a reference deformation amount;
   comparison means for comparing outputs from said subtractor and said reference deformation storage means and outputting a present flexure amount of said blade;
   correction means for correcting the flexure amount of said blade based on a detection amount of said flexure amount detection means so as to uniformly slice said work to the predetermined thickness, said correction means correcting the flexure amount by changing a relative position between said support base and said blade along a rotational axis direction of said blade, said correction means including:
   correction arithmetic means for calculating a correction rotational speed of said rotary support means for reducing a deformation amount detected by said flexure amount detection means to zero;
   control means for correcting a rotational speed of said rotary support means with the correction rotational speed calculated by said correction arithmetic means; and
   storage means for storing a correlation between the rotational speed of said rotary support means and the deformation amount of the blade according to the rotational speed in correspondence with the blade supported on said rotary support means.

5. The slicing machine according to claim 2, which further comprises:
   dress timing detection means for generating a dress signal of the blade when the correction rotational speed calculated by said correction arithmetic means exceeds a predetermined rotational speed.

6. The slicing machine according to claim 1, wherein said correction means comprises control means for causing said work moving means to variably control a feed amount of said work based on the detection amount from said flexure amount detection means.

7. A slicing machine which slices a work to a predetermined thickness, comprising:
   a rotary support means attached to a fixed position;
   a disk-shaped blade rotatably supported on said rotary support means and having a cutting edge for slicing said work at an inner peripheral portion thereof;
   a support base for supporting said work;
   work moving means for feeding said support base supporting said work by a predetermined amount with respect to said blade, said work fed by said work moving means being sliced by said cutting edge of said blade;

flexure amount detection means, arranged near said blade, for detecting a flexure amount of said blade during a slicing operation, said flexure amount detection means including:

a pair of deformation gauges arranged to oppose each other on two sides of said blade and comprising magnetic sensors;

a subtractor, connected to said deformation gauges, for subtracting signals input from said deformation gauges and outputting a difference;

storage means for storing a reference deformation amount;

comparison means for comparing outputs from said subtractor and said reference deformation storage means and outputting a present flexure amount of said blade; and correction means for correcting the flexure amount of said blade based on a detection amount of said flexure amount detection means so as to uniformly slice said work to the predetermined thickness, said correction means correcting the flexure amount by changing a relative position between said support base and said blade along a rotational axis direction of said blade.

* * * * *